United States Patent
Fall et al.

(10) Patent No.: US 8,406,127 B2
(45) Date of Patent: Mar. 26, 2013

(54) PRECEDENCE-BASED ROUTING/RE-ROUTING

(75) Inventors: Thomas C. Fall, Los Gatos, CA (US); Roger P. Chase, Columbus, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/973,135

(22) Filed: Oct. 9, 2001

(65) Prior Publication Data

US 2003/0067941 A1 Apr. 10, 2003

(51) Int. Cl.
*G01R 31/28* (2006.01)
(52) U.S. Cl. .................. 370/223; 370/216; 370/242
(58) Field of Classification Search .............. 370/235, 370/238, 392, 409, 431, 216–228, 242–251
See application file for complete search history.

(56) References Cited

U.S. PATENT DOCUMENTS

| | | | |
|---|---|---|---|
| 6,430,607 B1 * | 8/2002 | Kavner | 709/217 |
| 6,490,298 B1 * | 12/2002 | Chin et al. | 370/532 |
| 6,785,223 B1 * | 8/2004 | Korpi et al. | 370/218 |
| 6,807,648 B1 * | 10/2004 | Cansever et al. | 714/776 |
| 6,895,441 B1 * | 5/2005 | Shabtay et al. | 709/238 |
| 6,901,048 B1 * | 5/2005 | Wang et al. | 370/228 |
| 6,910,024 B2 * | 6/2005 | Krishnamurthy et al. | 705/400 |

* cited by examiner

*Primary Examiner* — Phuc Tran
(74) *Attorney, Agent, or Firm* — Oblon, Spivak, McClelland, Maier & Neustadt, L.L.P.

(57) ABSTRACT

Precedence-based routing/rerouting algorithms or methods that work proactively and locally at each network node that engenders a collective restoral behavior that is uniquely rapid and anticipatory. The algorithms or methods are combined in a novel way with user precedence arbitration to provide superior performance in wireless dynamic ad hoc networks.

11 Claims, 3 Drawing Sheets

Fig. 3

| Signal Type | Signal Contents | Node Activity | Summary of Effects |
|---|---|---|---|
| RREQ – Route request | Destination ID<br>Stream ID<br>Precedence level<br>BW desired<br>QoS desired<br>Link IDs traversed<br>Cost incurred | A node will transmit this to all nodes that, from the topology map, could lie on a valid route, unless previous route discovery had shown they required a higher precedence | The update messages have provided a topology map at the node that may no longer be completely accurate, but does know which next nodes make sense. Eg, if there is SATCOM, a node might forward an RREQ backwards from the destination to get to a SATCOM gateway. As knowledge of what precedence can be supported by the various links, the RREQs would not be directed towards congested areas. |
| RREP – Route reply | Destination ID<br>Stream ID<br>Precedence level<br>BW granted<br>QoS granted<br>Link IDs traversed<br>Cost incurred<br>Return path IDs traversed | This packet is propagated back up the chain of links of the lowest cost route, activating them for the stream, and along the next lowest cost, reserving capacity for failover | In addition to allocating resources, each node traversed notes the RREP contents so as to update the topology and to add information as to the capability of the links. Note that for nodes close to this destination, most of the route, except for the very final legs, could still be appropriate |
| NRREP – Negative route reply | Destination ID<br>Stream ID<br>Link IDs traversed<br>Link ID that rejected<br>Reason for rejection | This packet is transmitted back up the chain of links to the source. It is also used to notify lower precedence streams that they are being canceled | The NNREP will tell where bottlenecks are. These might be due to either demand by higher precedence traffic or to lowered capacity of the link. In either case, this becomes a hole in the topology for lower precedence traffic. |
| PCANN Precedence Change Announcement Node ID | Destination ID<br>Precedence level affected<br>Add/Drop<br>Timing | A node sends this to neighbor nodes that would transmit into it for relay to Destination announcing a pending change in allowed precedence levels, either added or dropped. | These signals are used when a node recognizes a change in precedence levels being passed (timing = 0.0) or anticipates such a change (timing > 0). If there are affected routes, appropriate new RREPs would be generated if precedence level is dropped, or new RREPs would be issued if precedence level added. One affect is to keep low precedence RREPs out of congested areas. |

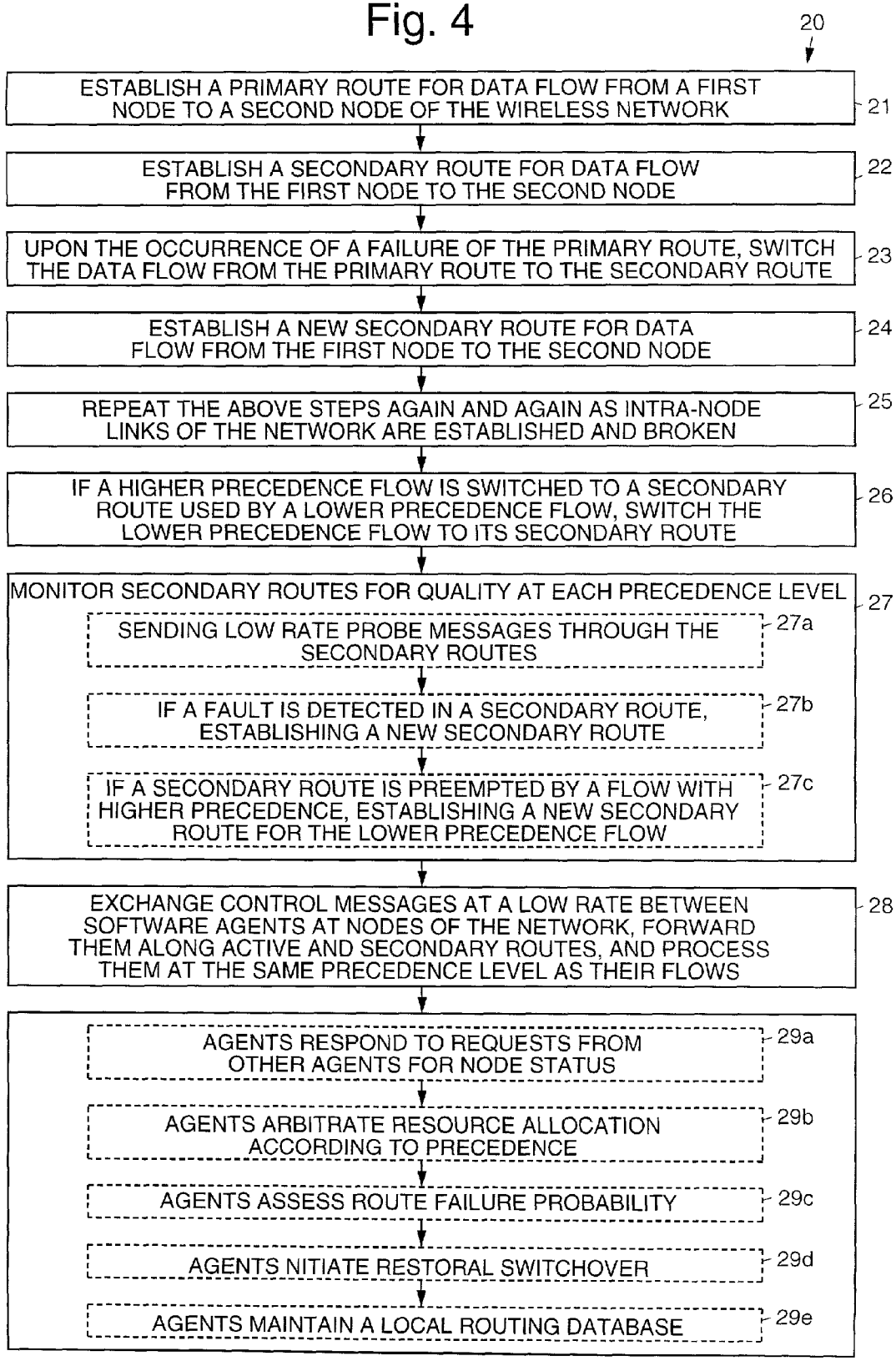

PRECEDENCE-BASED ROUTING/RE-ROUTING

BACKGROUND

The present invention relates generally to networks that have dynamically changing, bandwidth limited links, for example, wireless networks of mobile nodes, and more particularly, to methods that provide network management for these networks resulting in improved quality of service (QoS).

Methods to provide QoS for wireless ad hoc networks are being developed at many telecommunications technology companies, at universities, and by the Mobile Ad Hoc Network (MANET) Internet Engineering Working Group. A representative sample of this work is disclosed by S. Chakrabarti and A. Mishra in a paper entitled "QoS Issues in Ad Hoc Wireless Networks", IEEE Communications Magazine, pp. 142-148, February, 2001, which provides an overview of the academic work in this area. This document states at page 148 that: "We have not even mentioned the issue of network management for ad hoc networks with QoS in the main text; to our knowledge neither has anyone else."

When a user's data flow is interrupted by a fault, which might be due to a link failure or to contention in a node-to-node link that the flow is using, the interruption persists until the network control means establishes a new route that circumvents the fault. The time required to re-route the flow, referred to as the network time constant, is characteristic of the network control means and may depend on the size of the network.

The methods of the prior art incur delays while they detect faults and then discover or select alternate routes. The prior art discovery processes generate demand for bandwidth that can further degrade performance. This causes real-time flows to be interrupted. When these interruptions are lengthy or occur frequently, the performance may be unacceptable for applications like real-time voice communications or video teleconferencing. Moreover, the prior art does not recognize user precedence, leading to unpredictable and erratic connectivity when the network resource usage approaches saturation.

It is therefore an objective of the present invention to provide for methods or algorithms that provide improved quality of service (QoS) for dynamic networks by providing more predictable performance. It is also an objective of the present invention to provide for methods or algorithms that do not add burden onto resources that are already heavily utilized.

SUMMARY OF THE INVENTION

The present invention provides for novel precedence-based routing/rerouting algorithms or methods that work proactively and locally at each network node of a dynamic or mobile network and engender a collective restoral behavior that is uniquely rapid and anticipatory. The present invention utilizes user precedence arbitration in a novel way to provide superior performance in wireless dynamic ad hoc networks.

An exemplary communication method for use in a wireless network is implemented as follows. It is desired to transmit a data flow that has a certain precedence from one node, Node 1, to another node, Node 2, through the network. Node 1 initiates a "flood" search for a route, but in the present method, it is much more focused than standard flood techniques. An important facet of the novelty of the precedence-based routing/rerouting approach of the present invention is that it expands the link state concept from a "cost per link" to a "cost per link per precedence level". This will be seen to provide extremely advantageous overall performance. Because intermediate nodes have this knowledge, they will only propagate the request messages to nodes that know they have cost effective routes to the destination at the given level of precedence. Thus, most overhead traffic associated with this flood mechanism will not even be sent into regions of the network that are already congested, since those regions would require high precedence. Similar to the Dynamic Source Routing protocol, responses to these request messages sent back to the source are monitored by all the nodes passed through, updating each of their routing tables regarding what routes are available, but the precedence-based routing/rerouting approach also uniquely tabulates this by precedence level. Thus, low precedence requests flood only in uncongested areas of the network, medium precedence requests are only in uncongested or lightly congested areas, and only very high precedence are in highly congested areas.

The primary benefit of this approach is that high precedence traffic will effectively see the very good response times of a proactive protocol, but without the overhead on the congested links. This is because the low precedence requests discover network information through a reactive process in the less congested regions. For example, as one cluster of nodes moves past another, new links are established on the leading edge of the interface between the two clusters and old links are broken along the trailing edge. The lower precedence traffic is forced off of the existing old links and, since they are barred from the congested trailing edge area, look for their connections in the as yet uncongested leading edge area. Of course, once they have discovered the new links, this knowledge becomes known so the higher precedence may well usurp those connections.

Further, for real time traffic, back up routes can also be established. Links on the back up route of a high precedence flow can be used by lower precedence flows, but if the primary route of the high precedence flow fails, then these lower precedence flows are shed, and they go over to their back up routes, perhaps forcing even lower precedence traffic off those routes. The lower precedence flows are the ones forced to explore new territory and thus may have interruptions if this process takes longer than it takes for a higher precedence stream to usurp the lower precedence's primary path. However, knowledge discovered by the lower precedence efforts mean that generally the higher precedence discoveries take very little time, ensuring very predictable, uninterrupted flows.

The present invention thus establishes and maintains multiple flows of user data across a dynamic ad hoc wireless network, which flows are not interrupted, even while the network dynamically and automatically reconfigures itself. Also, the present invention establishes and maintains a quality of service (QoS) for each flow, at a level requested by each user and limited according to the user's pre-assigned precedence and by the available network resources.

The present invention provides a unique network control scheme that reduces or eliminates the delay in flow restoration following a link failure, while explicitly avoiding any additional broken or congested links, and takes account of user precedence in allocating resources to restore connectivity.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which:

FIG. 3 illustrates signaling types used in the present invention, what information is conveyed by that type, and the expected effect on a receiving node; and FIG. 4 is a flow diagram illustrating n exemplary methods or algorithms in accordance with the principles of the present invention that provide improved quality of service (QoS) for dynamic networks.

DETAILED DESCRIPTION

The present invention provides for methods 20 or algorithms 20 that improve quality of service (QoS) for a wireless or dynamic network. The methods 20 or algorithms 20 proactively discover a secondary route for every real-time user flow through the wireless or dynamic network. The present invention is referred to as precedence-based routing/rerouting.

Figure 1:
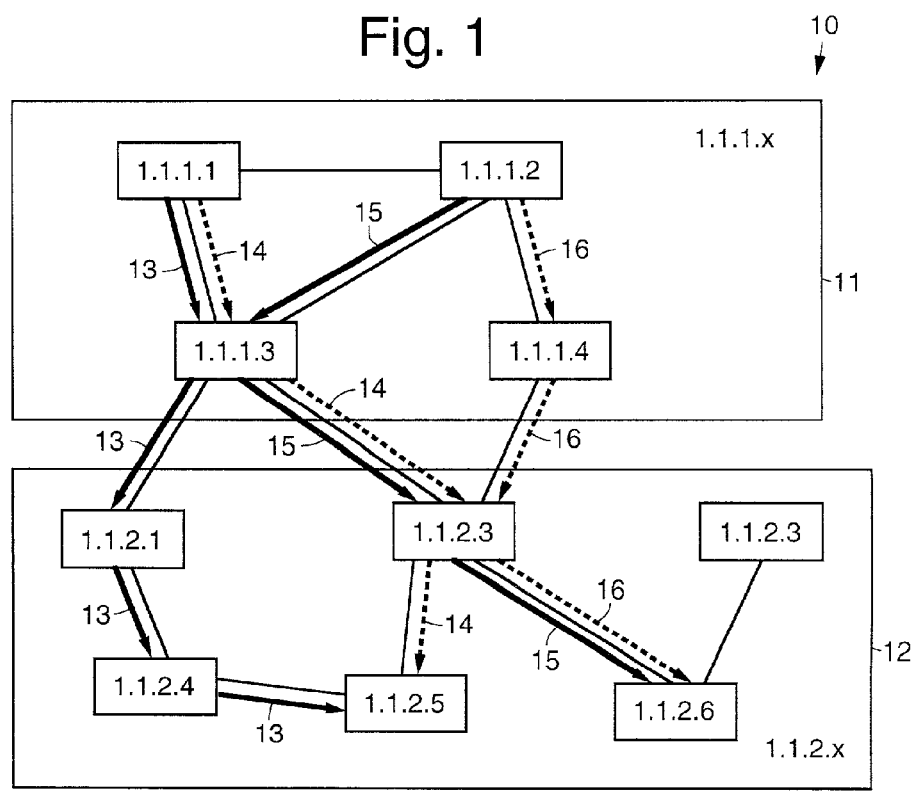
FIG. 1 illustrates an exemplary dynamic network in accordance with the principles of the present invention showing two clusters of nodes at an initial time.
Figure 2:
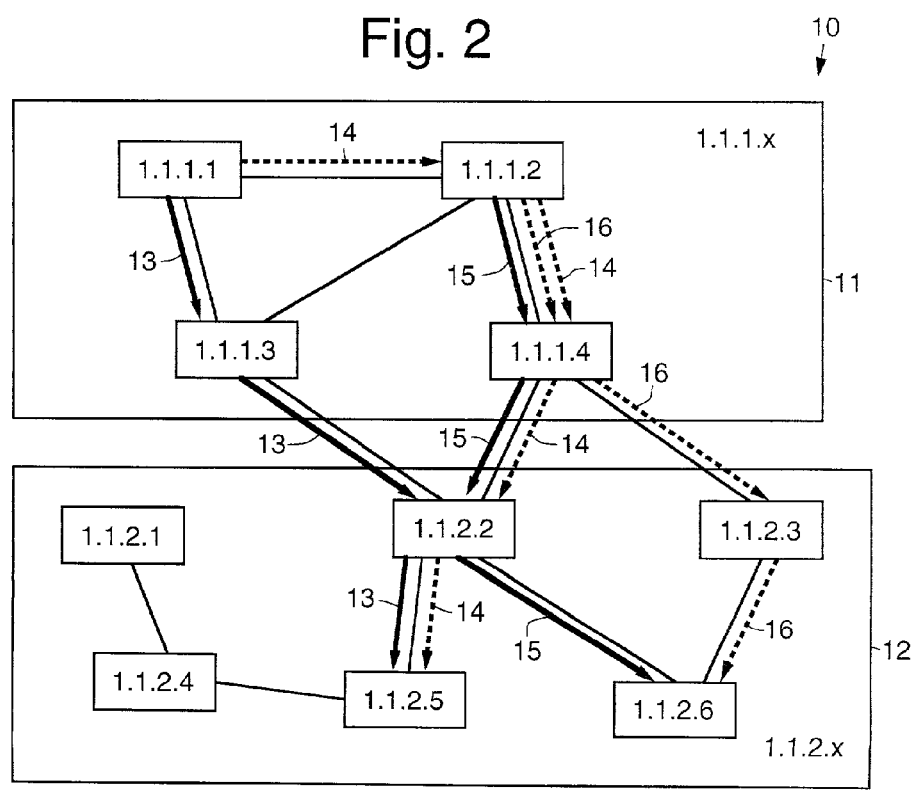
FIG. 2 illustrates the exemplary dynamic network with the two clusters of nodes at a later time.

Referring now to the drawing figures, FIG. 1 illustrates an exemplary dynamic network 10 in accordance with the principles of the present invention showing two clusters of nodes 11, 12 at an initial time. FIG. 2 illustrates the exemplary dynamic network 10 with the two clusters of nodes 11, 12 at a later time.

FIGS. 1 and 2 depict two clusters 11, 12 of nodes (also designated as 1.1.1.x and 1.1.2.x) that are moving relative to one another, the links between these clusters 11, 12 of nodes (which may be created or broken by the movement) and two representative traffic streams that are to be carried over this network 10 from nodes in one cluster 11 of nodes to nodes in the other cluster 12 of nodes. One of these traffic streams is a high precedence stream from node 1.1.1.1 to node 1.1.2.5 with its primary path shown as a thick solid arrowed line 13 and its backup path as a thick dotted arrowed line 14. The second, lower precedence stream is from node 1.1.1.2 to node 1.1.2.6 and its primary path is shown in a thick solid arrowed line 15 and its backup path is shown in a thick dotted arrowed line 16. Note that at the initial time, depicted in FIG. 1, the primary path of the lower precedence moves from the first cluster 11 (1.1.1.x cluster) to the second cluster 12 (1.1.2.x cluster) over the same link as the backup route of the higher precedence stream, namely the link from node 1.1.1.3 to node 1.1.2.2.

In FIG. 2, the nodes and links are shown after the clusters 11, 12 have moved, and it is seen how the precedence-based routing/rerouting approach of the present invention has readjusted the routes for the two traffic streams. The link from node 1.1.1.3 to node 1.1.2.1 has been broken so that the high precedence stream has failed over to its backup path which uses the link from node 1.1.1.3 to node 1.1.2.2. The lower precedence stream has had to fail over to Its backup stream which uses the link from node 1.1.1.4 to node 1.1.2.2. The new backup stream for the high priority stream from node 1.1.1.1, by discovering that there is a route from node 1.1.1.2 into cluster 1.1.2.x, develops its new backup path through this same node 1.1.1.4 to node 1.1.2.2. The lower precedence stream now needs to develop its backup route and by flooding into areas that are currently not highly contended, it discovers a new link that has been formed from node 1.1.1.4 to node 1.1.2.3 because of the movement of the clusters 11, 12. Once this has been set up, it also could well be usurped by the higher precedence streams.

The present invention thus monitors the quality of a primary route for data flow and proactively switches the flow over to a secondary route, in most cases, before the primary route has completely failed. When the flow has been switched, the secondary route becomes the new primary route, and the route discovery algorithm implemented by the present invention immediately operates to find another new secondary route. The flow is interrupted only if the new primary route fails before the new secondary route is established. This process is repeated again and again as nodes of the network 10 move relative to each other and as intra-node links are established and broken.

User precedence comes into play when a flow is switched from a primary route to a secondary route. Flows with lower precedence are not excluded from using links that are part of the secondary route for a higher precedence user. This assures that bandwidth (BW) is not wasted by the proactive restoral mechanism. However, if a higher precedence flow is switched to its secondary route, any lower precedence flows that cannot coexist with the higher precedence flow vacate the link that is in contention.

When the restoral algorithm performs an anticipatory switchover, one in which the primary route is going down but has not yet failed, there is time for lower precedence flows to switch to their secondary routes, if they exist, before their resources are preempted. Thus, every anticipatory switchover, at any precedence level, may cause a chain reaction in which the lower precedence flows are switched first to their secondary routes, followed up the hierarchy of precedence to the highest level of the anticipatory restoral action. However, if a link failure happens without warning, restoral switchover occurs immediately, and disruption propagates down the hierarchy of precedence to all flows affected by the resulting contention for bandwidth.

Secondary routes at every precedence level are monitored for quality by sending low rate probe messages through them. If a fault is detected, a new secondary route is established, even though the new secondary route might never be used. Also, secondary routes can be preempted by flows with higher precedence. When this happens, a new secondary route is established for the lower precedence flow.

Note, however, that secondary routes of all precedence levels can allocate the same resources to their routes, because contention occurs only when a secondary route become the primary route for some flow. Then, all the secondary routes for lower precedence flows are reassessed to determine if sufficient bandwidth remains throughout their routes to accommodate their primary flows, should that become necessary.

The processes of route discovery and quality monitoring are mediated by control messages exchanged at a low rate between software agents at nodes 11, 12 and forwarded along active and secondary routes. These control messages are handled at the same precedence level as their flows and thus, they are not transmitted into parts of the network 10 that are congested and therefore require a high precedence.

The behavior of the nodes 11, 12 depends on their knowledge bases and the signaling that comes into them. The signaling updates the knowledge bases of the nodes 11, 12 passed through and causes some actions, a change of resource allocation and/or some signaling to other nodes 11, 12. To help delineate this, FIG. 3 illustrates the signaling types, what information is conveyed by that type and the expected effect on a receiving node 11, 12.

Although the precedence-based routing/rerouting approach of the present invention could start with all nodes 11, 12 having no knowledge and the knowledge develops as traffic demands cause signaling to happen, the more knowledge that the nodes 11, 12 have, the less signaling is required. That is, if a node 11, 12 knows that certain paths are likely to be unproductive, then it will not send signaling in that direction. In a sense, the precedence-based routing/rerouting approach has enhanced the link-state paradigm to be from "cost per link" to "cost per link per precedence level". This provides the advantage that the signaling overhead avoids congested areas that might develop in the network 10.

Each node 11, 12 is equipped to build and maintain arrays for topology (which node 11, 12 is connected to which node 11, 12) and for cost/precedence for each destination for each outbound link from that node 11, 12. In addition, there is an array for each stream that is supported with its precedence, peak, average and effective bandwidths, destination and inbound link. There is a similar array for the streams which are using the outbound links as backup routes and another one for the streams desired but refused. If there is a mechanism that can sensibly group destinations, then these arrays could be compressed and there are several approaches to that. In FIGS. 1 and 2, it is tacitly assumed that this grouping is done by an Internet protocol (IP) subnet address masking approach in which nodes 1.1.1.1 through 1.1.1.4 are in subnet 1.1.1.x and nodes 1.1.2.1 through 1.1.2.6 are in subnet 1.1.2.x. However, other grouping methods may be used as well.

There are four basic types of signals used in the precedence-based routing/rerouting approach and their contents and effects are summarized in FIG. 3. If a source wishes to initiate a stream, it floods an RREQ message that is repeated to all outbound paths of the network which supports that precedence level. Most of these are not the lowest cost, but on the other hand, since they avoid high precedence regions, the signaling does not add burden onto nodes already heavily utilized. Since these signals include the list of nodes traversed, they may be used to help fill out the topological array. If a signal comes in that has already traversed that node, it is not propagated, but it does provide information about the outbound links from the node 11, 12 (note that many of the ad hoc protocols assume symmetric links, which is not necessarily true, especially when congestion is taken into account).

The first RREQ that arrives at a destination node 11, 12 causes the destination node 11, 12 to start a timer, and when it expires, the node 11, 12 issues a route reply, the RREP signal, based on the lowest cost RREQ received. As the RREP moves back up the list of traversed nodes 11, 12, the bandwidth is allocated to the stream. The intermediate nodes 11, 12 can also use the information to update the cost information to get to that destination node 11, 12 (and others in that same group).

If the RREQ arrives at a node that has no path to the destination available at that precedence level, it sends back a negative reply, NRREP. The nodes 11, 12 that receive this can update their knowledge bases to reflect that that destination (and others in its group) is not available along that path at that precedence level. If one of these intermediate nodes 11, 12 had sent the RREQs out only on the lowest cost outbound links, then if it receives NNREPs on all of those, it initiates RREQs on higher cost routes. If it gets NNREPs on all of its outbound links, it itself issues a NNREP. Thus, the knowledge about congested areas will move further back in the network 10 until reaching the points that have alternative paths.

If there is a change in a link's carrying capacity or in the overall demand for the link that causes a change in what precedence levels can be carried, the node issues a precedence change announcement, PCANN. If the precedence required is being raised, then this is sent to all nodes 11, 12 that have active or backup streams at the affected precedence levels and they are propagated back up until reaching nodes 11, 12 that have alternative paths. If the precedence required is being lowered, then this is propagated to those nodes 11, 12 that have indicated desire to use that links but were excluded because they did not meet the earlier precedence level (but now would).

With the above in mind, for the purposes of completeness, and with reference to FIG. 4, it illustrates a flow diagram showing exemplary methods 20 or algorithms 20 in accordance with the principles of the present invention that provides improved quality of service (QoS) for a wireless or dynamic network. The methods 20 or algorithms 20 implement precedence-based routing/rerouting in accordance with the principles of the present invention. The methods 20 or algorithms 20 proactively discover a secondary route for every real-time user flow through the wireless network.

The present methods 20 or algorithms 20 comprise the following steps. The methods 20 or algorithms 20 establish 21 a primary route for data flow from a first node to a second node of the wireless network. The methods 20 or algorithms 20 then establish 22 a secondary route for data flow from the first node to the second node.

Upon the occurrence of a failure of the primary route, the methods 20 or algorithms 20 switch 23 the data flow over to the secondary route, which becomes a new primary route. The methods 20 or algorithms 20 then establish 24 a new secondary route for data flow from the first node to the second node. This process is repeated 15 again and again as intra-node links of the network are established and broken.

If a higher precedence flow is switched 26a to a secondary route used by a lower precedence flow, the lower precedence flow is switched 26b to its secondary route and vacates the link.

Secondary routes at each precedence level are monitored 27 for quality by sending 27a low rate probe messages through the secondary routes. If a fault is detected in a secondary route, a new secondary route is established 27b, even though the new secondary route might never be used. If a secondary route is preempted by a flow with higher precedence, a new secondary route is established 27c for the lower precedence flow.

Control messages are exchanged 28 at a low rate between software agents at nodes of the network and are forwarded along active and secondary routes and are processed or handled at the same precedence level as their flows. The agents respond 19a to requests from other agents for node status, arbitrate 29b resource allocation according to precedence, assess 29c route failure probability, initiate 29d restoral switchover, and maintain 19e a local routing database.

Thus, precedence-based routing and rerouting methods or algorithms that provide improved quality of service (QoS) for wireless or dynamic networks have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A communication method for use in a dynamic network comprising:

allocating network resources of a dynamic network to a data stream based upon precedence levels of other data streams desiring the same resources or already utilizing the same resources;

finding routes from a source to a destination that can be supported at a given precedence;

establishing a primary route for data flow of a given precedence from a first node to a second node of the network using resources available at that precedence or lower;

establishing a secondary route for data flow from the first node to the second node using resources available at that precedence or lower;

upon the occurrence of a failure of the primary route, switching the data flow from the primary route to the secondary route;

establishing a new secondary route for data flow from the first node to the second node using signaling directed only to resources known to not be restricted to higher precedence levels; and repeating the above steps again and again as intra-node links of the network are established and broken, wherein each node is configured to track control signaling in a routing database and use this retained information to ensure that low precedence control is not forwarded into portions of the network known to require higher precedence; and secondary routes at each precedence level are monitored for quality by:

sending low rate probe messages through the secondary routes;

if a fault is detected in a secondary route, establishing a new secondary route, even though the new secondary route might never be used; and if a secondary route is preempted by a flow with higher precedence, a new secondary route is established for the lower precedence flow.

2. The method recited in claim 1 wherein the nodes are further configured to use the retained information to facilitate a route request.

3. The method recited in claim 1 wherein:

if a higher precedence flow is switched to a secondary route used by a lower precedence flow, the lower precedence flow is switched to its secondary route.

4. The method recited in claim 1 further comprising:

exchanging control messages at a low rate between software agents at nodes of the network and forwarding the control messages along active and secondary routes.

5. The method recited in claim 4 wherein the control messages are handled at the same precedence level as their flows.

6. The method recited in claim 4 wherein the agents respond to requests from other agents for node status, arbitrate resource allocation according to precedence, assess route failure probability, initiate restoral switchover, and maintain a local routing database.

7. The method recited in claim 1 wherein network resource allocation is based upon link bandwidth.

8. A communication method for use in a dynamic network comprising:

allocating network resources to a data stream based upon precedence levels of other data streams desiring the same resources or already utilizing the same resources;

finding routes from a source to a destination that can be supported at a given precedence level;

establishing a primary route for data flow of a given precedence from a first node to a second node of the network using resources available at that precedence or lower;

establishing a secondary route for data flow from the first node to the second node using resources available at that precedence or lower;

upon the occurrence of a failure of the primary route, switching the data flow from the primary route to the secondary route;

establishing a new secondary route for data flow from the first node to the second node using signaling directed only to resources known to not be restricted to higher precedence levels; and repeating the above steps again and again as intra-node links of the network are established and broken, wherein each node is configured to track control signaling in a routing database and use this retained information to unsure that low precedence control is not forwarded into portions of the network known to require higher precedence; and secondary routes at each precedence level are monitored for quality by:

sending low rate probe messages through the secondary routes;

if a fault is detected in a secondary route, establishing a new secondary route, even though the new secondary route might never be used;

if a secondary route is preempted by a flow with higher precedence, a new secondary route is established for the lower precedence flow; and if a higher precedence flow is switched to a secondary route used by a lower precedence flow, the lower precedence flow is switched to its secondary route.

9. The method recited in claim 8 wherein the nodes are further configured to use the retained information to facilitate a route request.

10. The method recited in claim 8 further comprising:

exchanging control messages at a low rate between software agents at nodes of the network and forwarding the control messages along active and secondary routes.

11. The method recited in claim 10 wherein the control messages are handled at the same precedence level as their flows.

\* \* \* \* \*